May 27, 1924.
L. C. STUKENBORG
COTTON HARVESTER
Filed Sept. 4, 1920
1,495,817
2 Sheets-Sheet 1
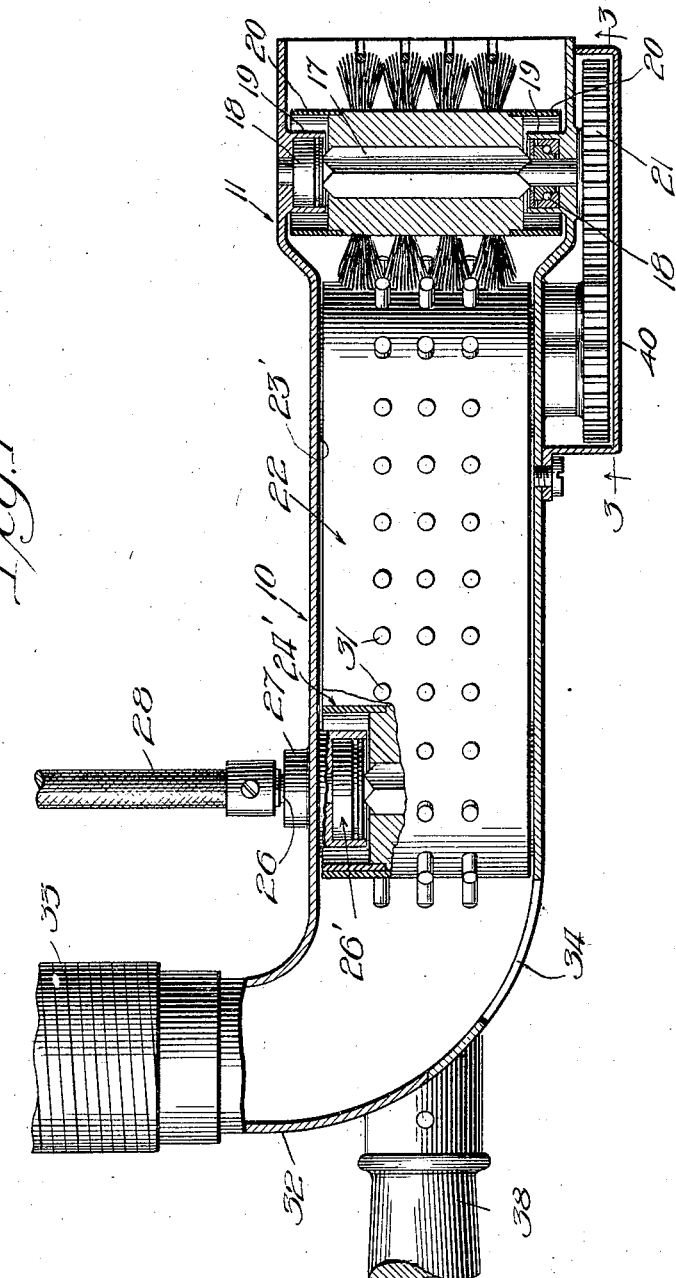
WITNESS:
Harry S. Gaither
INVENTOR.
Louis Carroll Stukenborg
BY
William H. Hale
ATTORNEY.

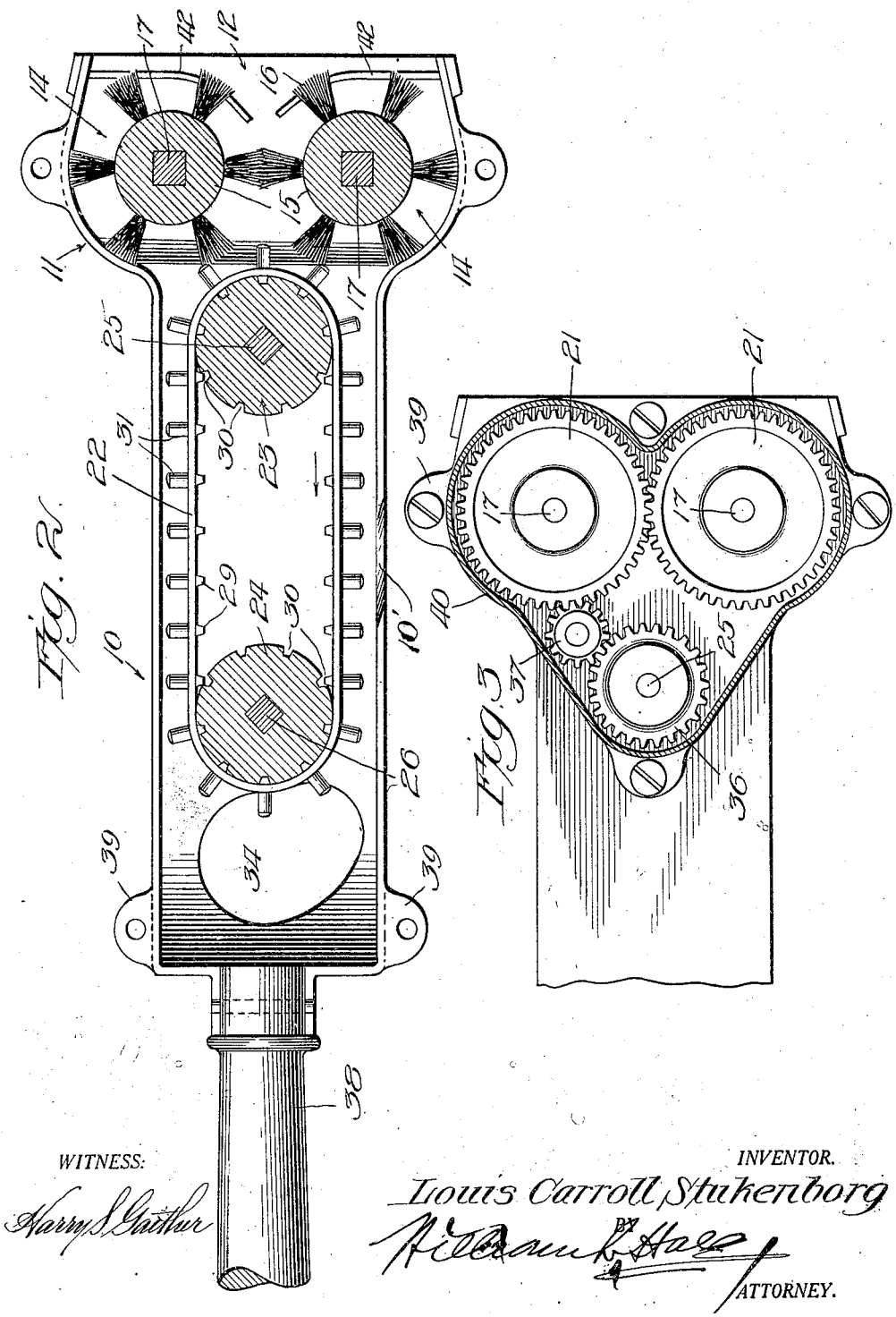

Patented May 27, 1924.

1,495,817

UNITED STATES PATENT OFFICE.

LOUIS CARROLL STUKENBORG, OF CHICAGO, ILLINOIS, ASSIGNOR, BY MESNE ASSIGNMENTS, TO STUKENBORG CORPORATION, OF WILMINGTON, DELAWARE, A CORPORATION OF DELAWARE.

COTTON HARVESTER.

Application filed September 4, 1920. Serial No. 408,277.

*To all whom it may concern:*

Be it known that I, LOUIS CARROLL STUKENBORG, a citizen of the United States, and a resident of Chicago, in the county of Cook and State of Illinois, have invented certain new and useful Improvements in Cotton Harvesters; and I do hereby declare that the following is a full, clear, and exact description thereof, reference being had to the accompanying drawings, and to the characters of reference marked thereon, which form a part of this specification.

This invention refers to improvements in cotton pickers of that general type illustrated in my prior United States Letters Patent Number 1,264,575, issued April 30, 1918, and refers more particularly to improvements in the take-off device by which the cotton is removed from the brushes and back into the influence of a moving body of air which is introduced or circulated through the head and through a flexible connection that extends backwardly to a suitable exhaust fan or blower, constituting a portion of the complete machine.

The invention consists in the combination and arrangement of the parts shown in the drawings and described in the specification, and is pointed out in the appended claims.

In the drawings;

Figure 1 is a view partially in section and partially in elevation of a picking device embodying my invention.

Figure 2 is a section taken at right angles to that shown in Figure 1, with parts shown in elevation.

Figure 3 is a detail of the gearing for operating the brushes and take-off mechanism, the view being taken on the line 3—3 of Figure 1.

A picker device embodying the present invention embraces, in combination with a suitable head or support, that is provided at one end, with an intake mouth for the cotton and at the other end with suitable means for connecting it to the suction tube of an exhaust blower, and is formed with suitable bearings for picker brushes and for a take-off device in rear thereof located wholly in the head, by which the cotton which is picked directly from the plant by the brushes is removed and carried rearwardly through the casing to the influence of the current of air passing through the head.

The casing may be of any suitable form to enclose the operative parts of the picker mechanism and to support bearings therefor, the whole being commonly known as the head. As herein shown, it comprises an elongated shell 10, which is formed at its forward end with an enlarged portion 11 to define the mouth 12 of the head. Within the head is rotatively supported picker brushes designated as a whole by 14, and embracing cores 15, preferably made of wood or other fibre, and radiating bristles 16. The shafts 17 of said compression cores are disposed in parallel planes and, as herein shown, are squared or made of other polygonal contour to engage like shaped axial openings in the core. The shafts of said brushes are mounted in suitable bearings designated as a whole by 18 in Figure 1, therein shown as roller bearings, which are supported within tubular flanges 19 extending inwardly from opposite walls of the head, and said bearings are preferably protected against the winding of cotton thereabout by annular shells 20 which extend endwise from the brushes across and overlap the tubular bearing flanges 19.

The said brush core shafts at one side of the head extend beyond the wall of the head casing and to their extended ends are fixed driving gears 21, best shown in Figure 3, through which rotary motion in opposite directions is transmitted to said shafts and to the brushes.

Located in rear of said brushes and cooperating therewith is a take-off device for removing the cotton from the brushes, and, made in accordance with the present invention. Said take-off device comprises an endless flexible belt 22 of any suitable character. It may be fibre, leather, or made up of a sprocket construction. Said plate is trained and tensioned between front and rear rollers 23, 24, located within the head the shafts 25, 26 of which are mounted in suitable bearings in opposite walls of the elongated casing 10 of the head. One of the rollers, the roller 24, as herein shown, is a driving roller and its shaft 26 is extended through its bearing 27 for connection to exterior driving shaft 28, herein shown as a flexible driving shaft adapted for connection with the driving power in any suitable way. The rollers 23 and 24 may run in bearings in the generally similar way as the brushes, as shown at the rear belt roller, wherein the roller shaft 26 runs within the casings or bearings 26' and the bearings are surrounded by shells 23', 24' to shield the brush bearings from the cotton entering about the bearings.

The belt 22 is herein shown as provided on the inner surface of its laps with cleats, teeth, or other projections 29, which are adapted to engage notches, slots, or openings 30 in the rollers 23, 24, whereby power delivered to the driving roller 24 is transmitted positively to the belt and the belt in turn drives the other or supporting roller 23 adjacent to the brushes. The belt is provided on the exterior faces of its laps with a plurality of outstanding short pins 31 and preferably the front roller 23 is located in such position relatively to the brushes that these pins 31, as they turn in the direction indicated by the arrow on Figure 2, engage or comb the bristles of the brushes so as to carry the cotton away from the brushes backwardly between one lap of the belt, as the mechanism herein shown is organized, and the adjacent wall of the casing. Located at the rear end of the casing is an outlet branch 32, shown as disposed at a general right angle to the elongated casing 10, and adapted to be connected to a flexible hose 33 that leads to an exhaust fan, whereby air current is induced in and through the head to carry the cotton which is released from the rear end of the take-off device, embracing the belt 22 and the rollers 23 and 24 from the head backwardly to a suitably located receptacle, in the general manner shown in my aforesaid prior United States Letters Patent. The principal portion of the air which furnishes the cotton conveying column is admitted to the casing through an inlet opening 10' on one side of the casing, along which the cotton travels, and another opening 34 that is located just in rear of the take-off device, and when the casing assumes the form shown in Figure 1 is located at the outer side of the angle between the branch 32 and said casing.

One end of the shaft 25 of the supporting roller 23 carries a gear pinion 36 which, through an idler 37, drives the gear wheels 21 of the picker brushes, so that thereby the said picker brushes are adapted to be driven indirectly from the flexible drive shaft 28 through the rollers 24, 23, the belt 22, and the gears 36, 37, and 21. The ratios of the gears 36 and 21 are such that the lineal speed of the pin carrying belt 22 will be considerably greater than the peripheral speed of the brushes, so as to thoroughly comb the brushes to free the cotton therefrom.

The head or casing may be provided with a handle 38 which extends rearwardly therefrom in line with the elongated portion 10, whereby said head may be directed to the cotton bolls. Preferably the head is so hung that it is in its operative position when in the position shown in Figure 1, so that the flexible drive shaft 28 may depend from a connection with an overhead drive shaft. Preferably and as herein shown, the shell or casing is made of two halves illustrated in Figure 2, that are connected together by suitable bolts or screws adapted to extend through overlapping ears or lugs 39. The line of division between the casing parts is in a plane at a right angle to the axis of the shaft 17, as shown in Figure 2, so that when the casing parts are removed from each other, the brushes can be removed by displacing them endwise relatively to their bearings. The said gears for driving and for transmitting driving motion to the brushes are preferably enclosed in a gear housing or guard 40 which may be bolted to the casing in any suitable manner.

Guards 42 of any suitable character are adapted to be disposed across the mouth 12 of the head, so as to avoid the entrance of large particles into the head between the brushes, such, for instance, as leaves, cotton burs, and the like.

In the operation of the device, the head may be guided to bring the brushes to the bolls through the agency of the handle 38. The brushes are rotated towards each other at their forward sides, so as to draw the cotton into and through the head 12, the brushes carrying the cotton backwardly into the influence of the traveling teeth 31 of the take-off belt 22. Said teeth comb or dislodge the cotton from the brushes and carry the same backwardly to the rear end of the head casing, where the cotton is brought into the influence of the moving column of air that is induced in the head and in the tube 33.

An advantage of the construction shown is its simplicity. The take-off device, embracing the rollers 23, 24 and the belt 22, can be made relatively short, so as not to objectionably increase the length of the head nor increase its weight. Furthermore, the active parts of the take-off device are simple, and are, therefore, not likely to get out of order. It will be understood that some of the conveying air will be drawn backwardly through the mouth 12 but that the major portion of the air forming the conveying air column that passes through the conveying tube 33 is admitted by way of the openings 10' and 34.

It will be noted that the belt 22 is made of a width greater than that represented by the outer side of the series of take-off pins 31, there being three rows of pins, as shown, and with the pins traveling between the bristle tufts. The margins of the belts outwardly beyond the outer rows of pins travel closely to the side walls of the heads, so as to prevent cotton dropping between the belt and the casing wall and thereby finding its way between the take-off belt and the driving and supporting rollers 24 and 23.

I claim as my invention:

1. A cotton picker comprising a head formed at one end with an intake mouth and at its other end with a pneumatic outlet opening for connection with a suction tube, means at said mouth for drawing the cotton into the head, and an endless studded belt-take-off device wholly within the head and trained about front and rear rollers also within the head.

2. A cotton picker comprising a head formed at one end with an intake mouth and at its other end with an outlet opening, brush means at said mouth for drawing the cotton into the head, and an endless studded belt take-off device wholly within the head and trained about front and rear rollers also within the head.

3. A cotton picker comprising a head formed at one end with an intake mouth and at its other end with an outlet opening, brush means at said mouth for drawing the cotton into the head, and an endless studded belt take-off device wholly within the head and trained about front and rear rollers also within the head for contact with and to remove cotton rearwardly from the brush means.

4. A cotton picker comprising a head formed at one end with an intake mouth and at its other end with an outlet opening, brush means at the mouth to draw the cotton into the head, and a belt take-off device wholly within the head trained over rollers also within the head between the brush means and said outlet, the head being provided adjacent to said outlet with an air intake opening.

5. A cotton picker comprising a head formed at one end with an intake mouth and at the other end with an exhaust outlet, rotative brush means at said mouth and an endless take-off belt wholly within the head and trained about rollers in rear of said brush means, the axes of said rollers being parallel to the axes of rotation of the rotative brush means.

6. A cotton picker comprising a head formed at one end with an intake mouth and at the other end with a suction outlet, brush means at said mouth for drawing the cotton into the mouth, a studded belt take-off device wholly within the head trained about front and rear rollers also within the head, one of which is a driven roller and drives the other roller through said belt.

7. A cotton picker comprising a head formed at one end with an intake mouth and at the other end with a suction outlet, brush means at said mouth for drawing the cotton into the mouth, a studded belt take-off device wholly within the head trained about front and rear rollers also within the head, one of which is a driven roller and drives the other roller through said belt, said head being provided in rear of said take-off belt device with an air inlet opening.

8. A cotton picker comprising a head formed with an intake mouth, brush means thereat for drawing the cotton into the mouth, and a belt take-off device having projections to remove cotton from the brush means and trained about front and rear rollers within the head, said head being provided at its rear end with an angularly disposed suction member adapted for connection to a suction tube and provided at its rear end with an axially aligned directing handle.

9. A cotton picker comprising a head formed at one end with an intake mouth and at its other end with means to connect it to a suction tube, brush means at said mouth for drawing cotton into the mouth, an endless belt take-off device wholly within the head having projections to remove the cotton from the brush means and trained about front and rear rollers also within the head, driving means connected to the rear roller, and the belt operating to drive the front from the rear roller, and gear connections between the front roller of the take-off device and said brush means.

10. A cotton picker comprising a head formed at one end with a mouth and at its other end with an exhaust opening, rotating, interacting brushes at the mouth, and a take-off device between the brushes and said exhaust opening, embracing an endless belt wholly within said head formed with exterior projections and front and rear rollers over which the belt is trained, and by one of which the belt is driven.

11. A cotton picker comprising a head formed at one end with a mouth and at its other end with an exhaust opening, rotating, interacting brushes at the mouth, and a take-off device between the brushes and said exhaust opening, embracing an endless belt formed with exterior projections, front and rear rollers over which the belt is trained, and by one of which the belt is driven, gears connected to the said brushes and meshing with each other, and gear connections for rotating the brushes from said front take-off belt rollers.

In witness whereof I claim the foregoing as my invention, I hereunto append my signature this 11th day of August, 1920.

LOUIS CARROLL STUKENBORG.